Feb. 8, 1966  R. W. GOLDIN  3,233,455
AIRCRAFT LOAD-FACTOR INDICATOR
Filed July 5, 1963  3 Sheets-Sheet 1
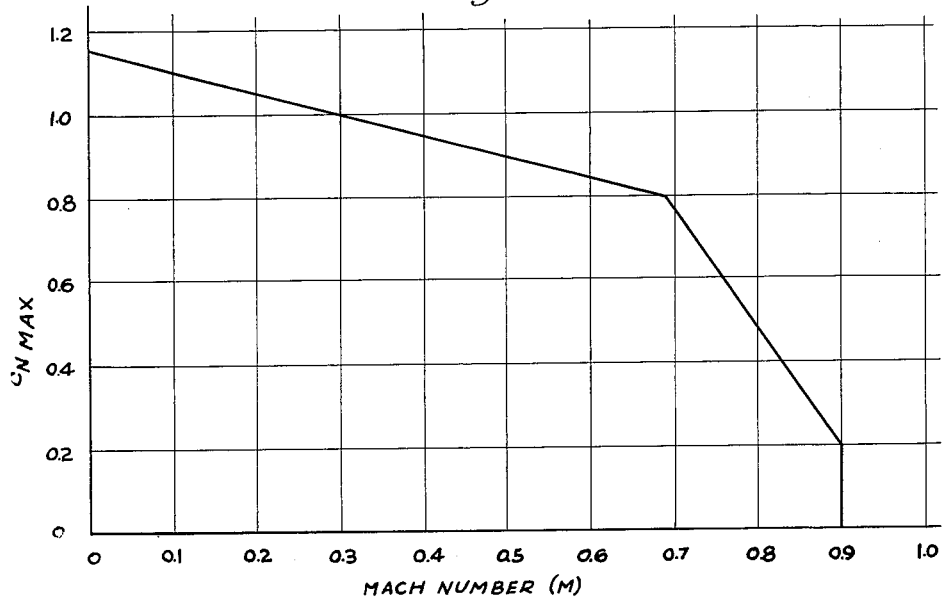
TYPICAL $C_N$ MAX. VS. MACH NUMBER FOR MODERATE BUFFET
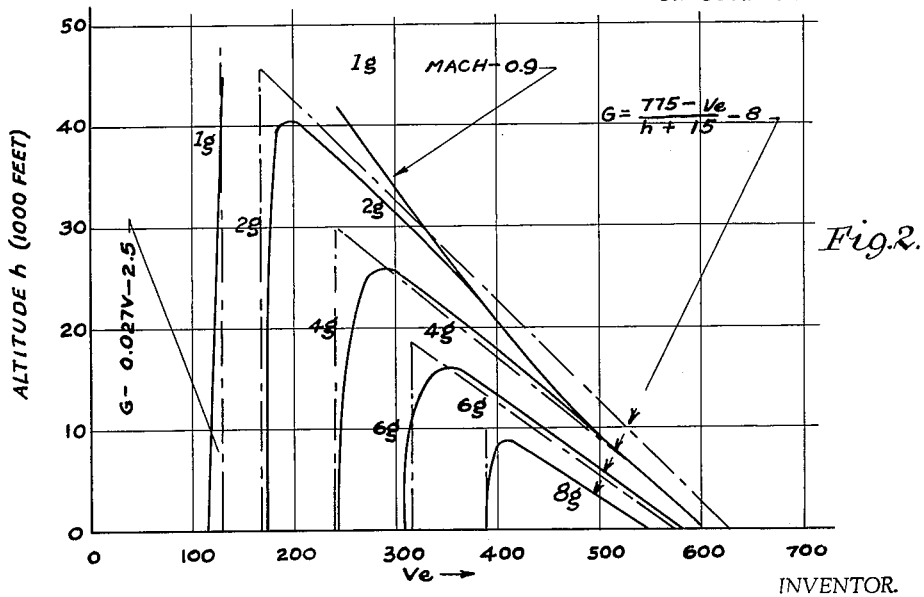
INVENTOR.
ROBERT W. GOLDIN

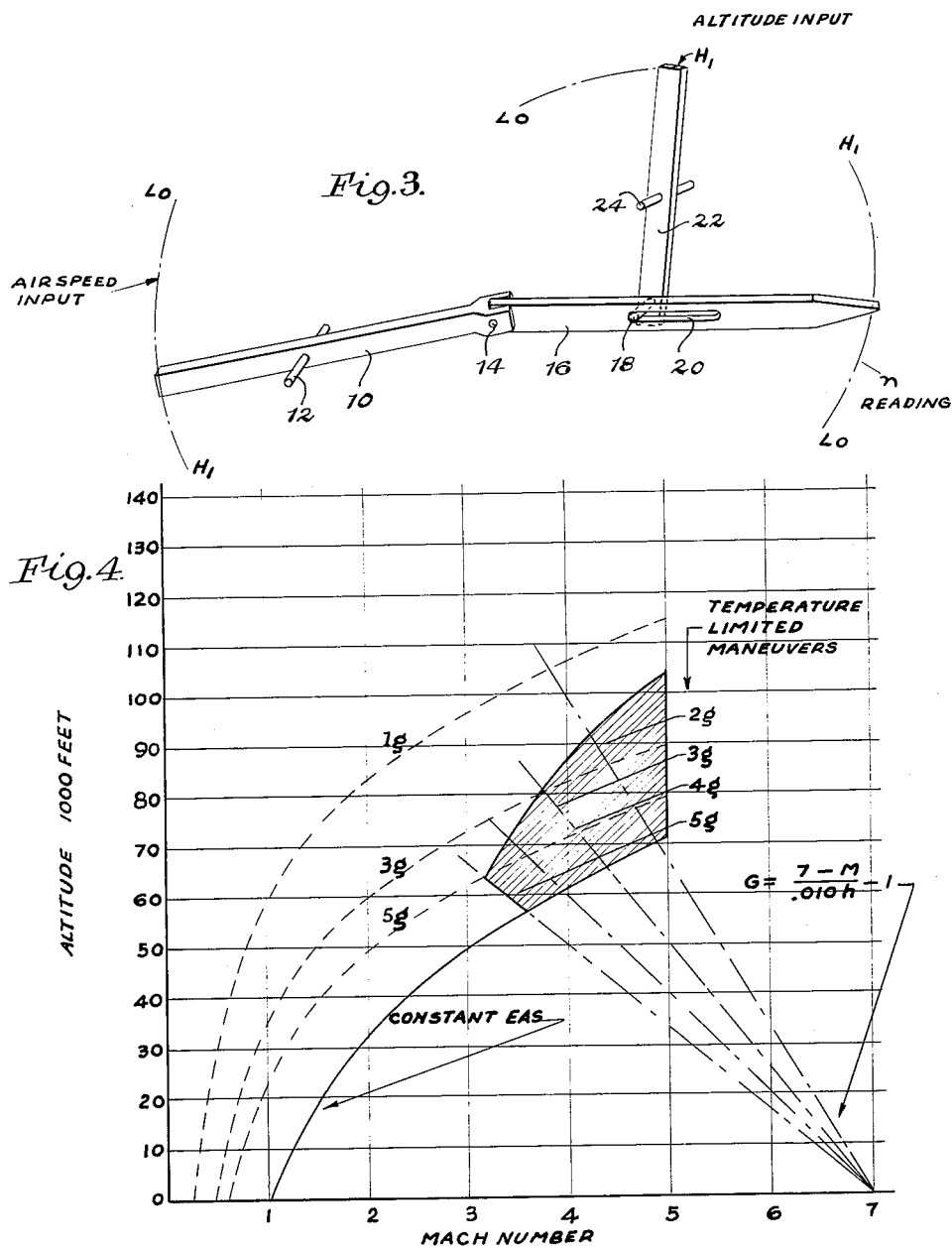

Feb. 8, 1966  R. W. GOLDIN  3,233,455
AIRCRAFT LOAD-FACTOR INDICATOR
Filed July 5, 1963  3 Sheets-Sheet 3
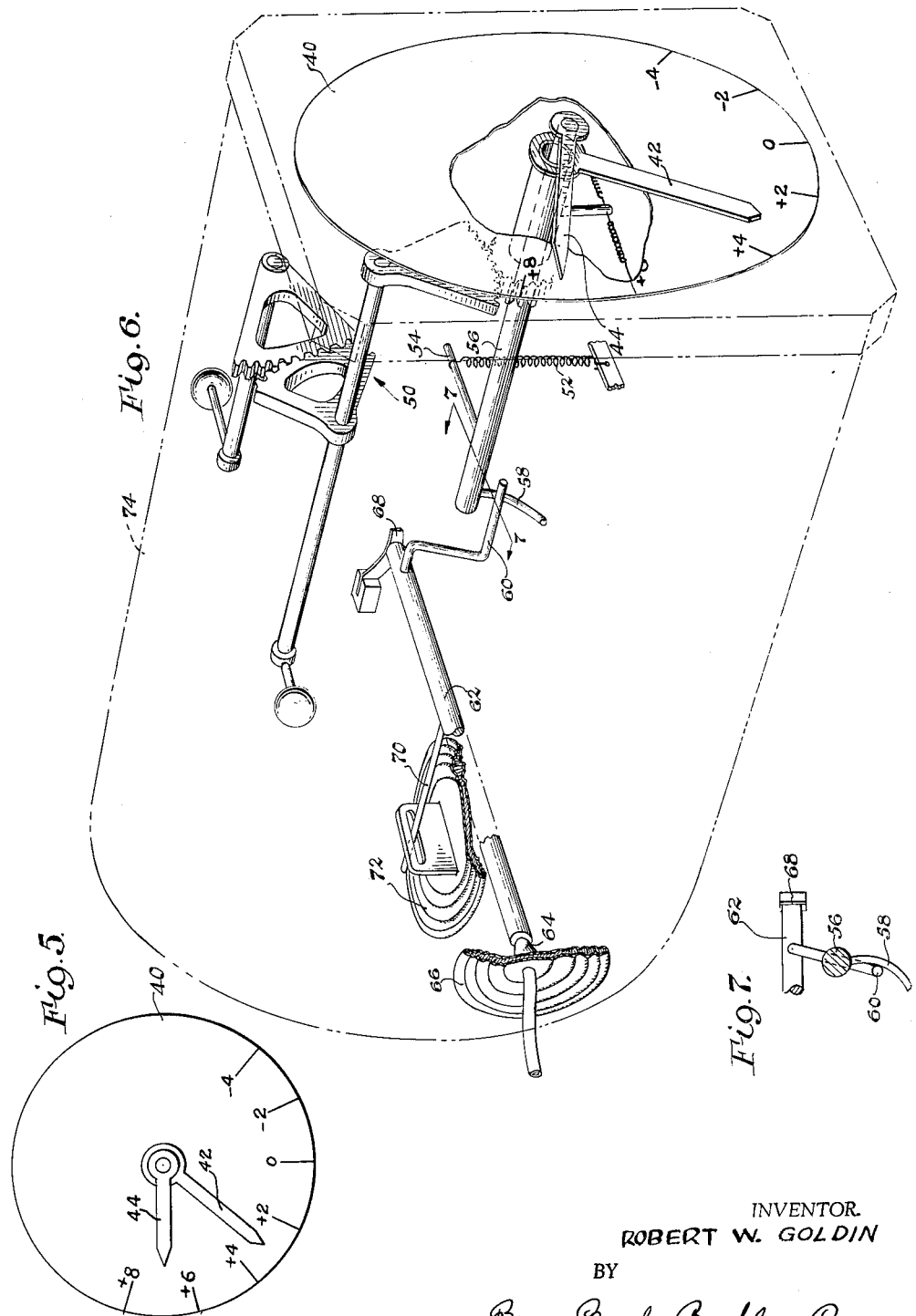
INVENTOR.
ROBERT W. GOLDIN
BY
Bean, Brooks, Buckley + Bean
ATTORNEYS 3,233,455
AIRCRAFT LOAD-FACTOR INDICATOR
Robert W. Goldin, Palo Alto, Calif., assignor to Bell
Aerospace Corporation, Wheatfield, N.Y.
Filed July 5, 1963, Ser. No. 292,882
5 Claims. (Cl. 73—178)

This invention relates to aircraft flight instruments, and more particularly to improvements in such instruments as are adapted to portray to the aircraft pilot, accurately and instantaneously, fundamental structural operating limitations on the aircraft and/or tactical maneuvering-capability information; and is a continuation-in-part of my copending application Serial No. 618,396, filed October 25, 1956, now abandoned.

Structural design or operating limitations can be properly defined for any aircraft by parameters designated $n$ (limit load factor); $Ve$ (equivalent air speed); M (Mach number); $h$ (altitude); and GW (airplane gross weight). Complete definition of the above terms, and general relationships of these with airplane design conditions are provided in the standard structural design specifications of modern aircraft. Basically, these parameters have been used because they are directly associated with the performance limits desired of any aircraft, and provide closely definable conditions upon which structural design can be predicated.

With the advent of trans-sonic flight, the increase in altitude capability of aircraft, and now the further complications incurred in flight due to aerodynamic heating, it has become common practice to let design (or operating) load factor ($n$) vary not only with gross weight GW, but often also with Mach number M or equivalent airspeed $Ve$, and altitude $h$. In order not to confront the pilot with the time consuming and confusing task of consulting carpet-plots of the parameters M, $Ve$ and $h$, the instrument of the present invention has been designed to at all times provide instantaneous readings of load factor $n$ as a function of such parameters. It is obvious, that under conditions of stress, such as in combat operations, such knowledge may mean the difference between safe return or loss of the aircraft and the pilot.

Generally stated, the instrument of the present invention provides two readings: (1) a measure of actual load factor (or acceleration in "G" units) as furnished by a conventional accelerometer mechanism, and (2) a movable red-line indication of "permissible" load factor $n$. The "red-line" indication is made a function of two or more parameters which influence permissible load factor, and can be designed to provide all necessary interpolations, or only a partial interpolation. In general, it will suffice to make this limit indication vary with only two parameters, and in the interest of simplicity, it is preferred not to subject the indication to variations from changes in gross weight, because pilots have been fully indoctrinated in allowing for that change intuitively. In most cases, it is found that a linear or logarithmic variation of "$n$" with $Ve$ or M and $h$ will portray quite adequately the load factor limitations. This can be simply accomplished by taking accurately available measurements of those parameters, and with appropriate mechanical (or electrical) hook-ups translate the inputs into a "permissible G" or maximum load factor $n$ indication.

Hence, it will be appreciated that a number of combinations representing load-factor limits on present and future aircraft may be designed, in accordance with the present invention; and that such instrument designs can be translated into self-contained cockpit-panel instruments of relatively simple and practical constructions because such instruments may employ previously developed components and mechanical elements and linkage as used in presently conventional accelerometers, altimeters, air speed indicators, Mach meters, and the like. For simplicity of reference, the instrument of the present invention may be tilted a "G-limit indicator," and will of course in any instance be designed upon formulations of the required algebraic representations of the operating limits for any particular aircraft. The necessary adjustments and alterations of the instrument may subsequently be accomplished by the instrument manufacturer for any specific aircraft model.

Other objects and advantages of the invention will appear from the specification hereinafter and in the accompanying drawings, wherein FIGS. 1 and 2 are plots showing certain parameters germane to this invention;

FIG. 3 is a diagrammatic view of a linkage arrangement according to this invention;

FIG. 4 is another plot showing certain parameters germane to this invention;

FIG. 5 is a view showing the dial and pointers of this invention;

FIG. 6 is a perspective view of an embodiment of the invention; and

FIG. 7 is a sectional view taken through shaft 56 of FIG. 6.

The plot shown in FIG. 1 represents values of $C_{n\ max}$ (maximum coefficient of lift) versus M for typical subsonic aircraft at which moderate buffet is experienced. If this curve is exceeded slightly, severe buffet and attendant structural damage is likely. Using this curve, in conjunction with the characteristics of the typical aircraft, curves relating altitude and equivalent airspeed to various load factor limits $n$ may be determined as shown in FIG. 2. For the specific plot of FIG. 2, the lines of constant limited values of $n$ can be very closely approximated by the equation $$n = \frac{775 - Ve}{h + 15} - 8$$

as is shown by the dashed lines in that figure. In general terms, relating to various types of aircraft, this equation may be expressed:

(1) $$n = \frac{K_1 - Ve}{h + K_2} - K_3$$

where: $K_1$, $K_2$ and $K_3$ are constants determined for the particular aircraft involved.

Computationally, a linkage system such as is shown in FIG. 3 may be employed. In this figure, the airspeed ($Ve$) input link 10 is provided with a fixed pivot 12 with such link being movable between high and low airspeed values as indicated, movement of the link being effected by any suitable means responsive to $Ve$. The link 10 is pivotally connected as at 14 to the $n$ indicator link or pointer 16 adapted to sweep a dial or the like having high to low readings as indicated. The link 16 is constrained by the pivot 18 whose location in the slot 20 is determined by the altitude input link 22. This latter link is moved by suitable altitude responsive mechanisms between high and low inputs as indicated, causing link 22 to pivot about the fixed pivot 24 and thus shift the position of the pivot 18 within the slot 20. In this fashion, the requisite $n$ reading of pointer 16 may be effected as determined by the altitude and airspeed inputs of links 22 and 10.

Another application for the G-limit Indicator will exist in supersonic regions, where aerodynamic heating effects will influence operating (and design) structural limitations. In a case where altitude, Mach number, and angle-of-attack constitute the primary parameters which influence thermal conditions, the diagram shown in FIGURE 4 is the type of operating instruction which might be given to the pilot. Since temperature is a function of time and specific location on the airplane, as well as the above mentioned parameters, it is rather inadequate for use in indicating severity of a given flight condition. Hence, it will generally be best to define operating regions with reference to the basic parameters shown in FIGURE 4, with some stipulation as to the time-duration for operations at elevated temperatures.

The G-limitations indicated in FIGURE 4 can be closely approximated by an equation of the form:

(2) $$n = \frac{K_1 - M}{K_2 h} - K_3$$

where $K_1$, $K_2$ and $K_3$ are constants determined for the particular aircraft involved.

For the specific plot of FIG. 4, the values of the constants are $K_1 = 7$; $K_2 = 0.010$; and $K_3 = 1$. In any event, however, the computation of Equation 2 is similar to that of Equation 1. That is to say, these equations are computationally sufficiently similar so that a linkage system such as is shown in FIG. 3 can be used for the solution to Equation 2 with suitable Mach number input being applied to the link 10 of that figure.

FIG. 5 illustrates the dial and pointer arrangement for an instrument according to this invention. As shown, the dial 40 is provided with indicia pertaining to load factor, marked in "gravity" units. The pointer 42 is connected to any suitable conventional mechanism for moving such pointer to indicate the load imposed upon the aircraft whereas the pointer 44 is connected to mechanism establishing the load factor reading in accord with this invention. In use, the pilot maintains the pointer 42 "behind" or at a position not to exceed the pointer 44, as will be obvious.

Referring to FIG. 6, wherein a practical embodiment of the invention is shown, conventional mechanism for moving the pointer 42 is indicated generally by reference character 50, the details thereof forming, per se, no part of the present invention. The pointer 44, on the other hand, is rigid with the shaft 56 and this shaft 56 also mounts a lever 58, see FIG. 7, bearing against an operating finger 60 rigid with the actuating shaft 62. The shaft 62 is mounted for rotation as well as axial movement by suitable bearing means not shown, with one end of this shaft bearing against the movable actuator 64 of an airspeed bellows 66 and the opposite end bearing against a suitable spring loading device 68. The shaft 62 carries a rigid arm 70 actuated by the altitude sensitive bellows 72. The interior of the casing 74 is vented to ambient atmosphere so that the bellows 66 measures only dynamic pressure indicative of airspeed, while the sealed bellows 72 is free to expand as the ambient static pressure decreases. Thus, whereas the spring 52 which acts through the lever 54 rigid with the shaft 56 tends to urge the pointer 44 in clockwise, increasing load factor reading direction, the actuating shaft 62 operates through its finger 60 bearing against the lever 58 to oppose or limit the movement of the shaft 56 as occasioned by the spring 52. Therefore, expansion of the airspeed bellows 66, and consequent axial movement of the shaft 62 to the right in FIG. 6 in opposition to the spring 68, will move the shaft 56 in counterclockwise direction while expansion of the altitude bellows 72, and consequent clockwise rotation of the shaft 62 in FIG. 6, will also move the shaft 56 in counterclockwise direction, and vice versa. Since counterclockwise motion of the shaft 56 causes the pointer 44 to read decreasing load factor, and since either or both increasing altitude and increasing airspeed will effect such motion of the shaft 56, and vice versa, the conditions of Equation 1 are met. Naturally, however, the proper lever arms for the system must be selected and, as well, the proper variations in lever arms in accord with altitude changes must be selected.

To better appreciate this relationship, reference may be had to the specific form of Equation 1, $$n = \frac{775 - Ve}{h + 15} - 8$$

For values of $Ve$ of 500 and 450 knots and a value of $h = 10$ (10,000 ft.), the values of $n$ are computed as 3 and 5 respectively. Thus, at $h = 10$, a change of airspeed of 50 knots will effect an $n$ reading change of 2. However, for the same values of $Ve$ but with $h = 5$, the values of $n$ are computed as 5.75 and 8.25 respectively, corresponding to a change of $n$ of 2.5 relative to a change of airspeed of 50 knots. Therefore, it can be seen that load factor changes more rapidly for a given change in airspeed ($\Delta Ve =$ constant) as the altitude decreases and, also, the above figures show that load factor changes more rapidly for a given change in altitude ($\Delta h =$ constant) as the airspeed decreases. Thus, the following four conditions must apply to satisfy Equation 1:

(1) As $h$ decreases, $n$ increases, and vice versa
(2) As $Ve$ decreases, $n$ increases, and vice versa
(3) The change in load factor ($\Delta n$) becomes smaller, as $Ve$ increases, for a given change in altitude ($\Delta h =$ constant)
(4) The change in load factor ($\Delta n$) becomes smaller, as $h$ increases, for a given change in airspeed ($\Delta Ve =$ constant).

That the first two conditions are met by the arrangement of FIG. 6 is obvious. As to the third condition, it can be seen, from FIG. 7, that as $Ve$ increases, shaft 62 will be moved to the right, thus lengthening the effective lever arm of lever 58, so that a given movement of finger 60 caused by rotation of shaft 62 ($\Delta h =$ constant) will effect a smaller corresponding change in load factor ($\Delta n$). As to the fourth condition, FIG. 7 also shows that as $h$ increases, shaft 62 will be rotated to move finger 60 downwardly to thus lengthen the effective lever arm of lever 58, so that a given movement of finger 60 caused by a given axial displacement of shaft 62 ($\Delta Ve =$ constant) will effect a smaller corresponding change in load factor ($\Delta n$).

Therefore, it will be appreciated that the invention provides a single aircraft instrument which may be constructed to present to the view of the pilot a single scale and a pair of pointers adapted to sweep the same scale. One of the pointers will indicate directly the actual number of "G's" operating upon the aircraft while the other pointer, normally to be painted red, indicates the permissible "G" reading or position of the first pointer within safe limits of operation for the aircraft. Thus, the pilot need only watch the needle 42 to see that it does not exceed the position of the pointer 44 in order to be assured of safe operation of the aircraft. Hence, it is not necessary for the pilot to consult more than the single instrument of the invention to gain at a glance full information both as to his momentary actual vertical load factor, and to the relation thereof to the maximum permissible load factor for the aircraft under the existing conditions of flight.

Whereas herein only one specific example of a vertical acceleration responsive mechanical instrument of the invention has been illustrated and described in detail it will be understood that various changes may be made therein; to accommodate it to respond to accelerations in any direction or that the input signal integrations and transmissions to the indicator pointers may be effected by electrical means in lieu of mechanical means, without de-

I claim:

1. An aircraft instrument comprising
a body having a dial fixed thereto bearing indicia corresponding to units of load factor,
a first pointer mounted to sweep said dial, accelerometer means mounted on said body and connected to said first pointer for moving the same to indicate the actual load factor to which an associated aircraft is subjected,
a second pointer mounted to sweep said dial, and means mounted on said body and connected to said second pointer for moving the same to indicate the maximum load factor to which an associated aircraft may be subjected,
the last mentioned means including altitude sensing means connected to said second pointer to move the same in decreasing load factor direction as a function of increasing altitude, and airspeed sensing means connected to said second pointer to move the same in decreasing load factor direction as a function of increasing airspeed.

2. The instrument according to claim 1 wherein said altitude ($h$) sensing means and said airspeed ($Ve$) sensing means move said second pointer to indicate maximum load factor ($n$) substantially according to the equation:

$$n = \frac{K_1 - Ve}{h + K_2} - K_3$$

where $K_1$, $K_2$ and $K_3$ are constants.

3. An aircraft instrument comprising
a body having a dial fixed thereto bearing indicia corresponding to units of load factor,
a first pointer mounted to sweep said dial,
accelerometer means mounted on said body and connected to said first pointer for moving the same to indicate the actual load factor to which an associated aircraft is subjected,
a second pointer mounted to sweep said dial,
and means mounted on said body and connected to said second pointer for moving the same to indicate the maximum load factor to which an associated aircraft may be subjected,
the last mentioned means including altitude sensing means connected to said second pointer to move the same in decreasing load factor direction as a function of increasing altitude, and Mach number sensing means connected to said second pointer to move the same in decreasing load factor direction as a function of increasing Mach number.

4. The instrument according to claim 3 wherein said altitude ($h$) sensing means and said Mach number ($M$) sensing means move said second pointer to indicate maximum load factor ($n$) substantially according to the equation:

$$n = \frac{K_1 - M}{K_2 h} - K_3$$

where $K_1$, $K_2$ and $K_3$ are constants.

5. An aircraft instrument comprising
a body having a dial mounted thereon,
a pointer mounted to sweep said dial,
acceleration responsive mechanism mounted on said body and connected to said pointer for moving the same to sweep said dial,
a second pointer mounted to sweep said dial,
and maximum acceleration responsive mechanism operating as a function of a combination of parameters including altitude and at least one of airspeed and Mach number,
said maximum acceleration responsive mechanism being mounted on said body and connected to said second pointer,
said mechanism and pointer being so arranged and positioned relative to said dial as to normally dispose said second pointer positionally ahead of the first mentioned position, thereby providing said second pointer as a visually limiting parameter not to be exceeded by the first pointer within safe limits of operation of an associated aircraft.

References Cited by the Examiner

UNITED STATES PATENTS

| | | | |
|---|---|---|---|
| 2,139,694 | 12/1938 | Reid et al. | 73—178 X |
| 2,182,706 | 12/1939 | Shanley | 73—178 X |
| 2,424,511 | 7/1947 | Stanley et al. | 73—178 |
| 2,452,621 | 11/1948 | Weissenbach | 73—178 |
| 2,538,303 | 1/1951 | Findley | 73—178 |
| 2,620,390 | 12/1952 | Sunderland | 340—27 X |
| 2,682,768 | 7/1954 | White | 73—178 X |
| 2,706,407 | 4/1955 | Hosford | 73—182 |
| 2,807,165 | 8/1957 | Kuzyk et al. | 73—178 |
| 2,807,958 | 10/1957 | Anastasia et al. | 73—178 |
| 2,827,621 | 3/1958 | Reichert et al. | 340—27 |
| 3,033,035 | 5/1962 | Snodgrass | 73—178 |

LOUIS R. PRINCE, *Primary Examiner.*